No. 653,815. Patented July 17, 1900.
A. L. MILLER.
VEHICLE TIRE.
(Application filed Feb. 8, 1900.)

(No Model.)

Witnesses
Inventor
Albert L. Miller
By Milo B. Stevens & Co.
Attorneys

United States Patent Office.

ALLEN L. MILLER, OF CHICAGO, ILLINOIS, ASSIGNOR OF TWO-THIRDS TO NICHOLAS BLAHA AND HENRY F. ERICHSEN, OF SAME PLACE.

VEHICLE-TIRE.

SPECIFICATION forming part of Letters Patent No. 653,815, dated July 17, 1900.

Application filed February 8, 1900. Serial No. 4,568. (No model.)

*To all whom it may concern:*

Be it known that I, ALLEN L. MILLER, a citizen of the United States, residing at No. 1685 Fulton street, Chicago, in the county of Cook and State of Illinois, have invented certain new and useful Improvements in Tires for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in tires for vehicles, and it is embodied in the construction and arrangement hereinafter described, and definitely pointed out in the claims.

The invention relates more particularly to a tire intended for application to a standard or other form of felly, conveniently to wooden fellies, and is intended to meet the requirements of laws and regulations of certain communities relative to the use of broad-tread wheels or tires, and the invention is intended to be applied to the ordinary wheel and make thereof a broad-tread wheel without materially altering or varying the construction of the felly or wheel proper.

With this end in view the invention is illustrated in the two forms shown in the accompanying drawings, although it is to be understood that various changes and alterations can be made without departing from the nature and principle of the invention.

Figure 1:
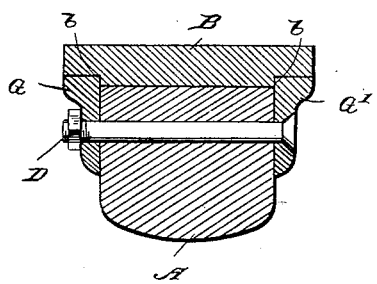
Figure 2:
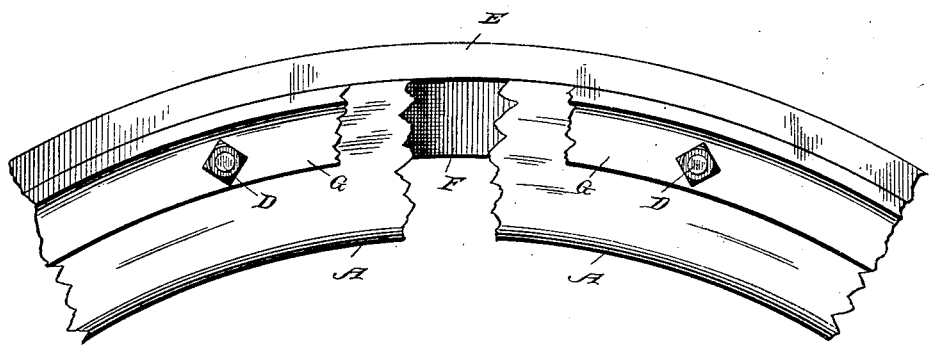

In the drawings, Figure 1 represents a cross-section of a felly having the improvement thereon. Fig. 2 is a sectional side view, and Fig. 3 is a cross-section of a modified form.

In the drawings, A represents a wooden felly of the usual or generally-preferred type. On this felly is placed a metal tire B. This tire is of a width greater than the width of the felly and extends sufficiently laterally beyond the same to constitute the broad gage or tired wheel. The tire is placed on the felly in any convenient manner, preferably by shrinking. The overhanging portions of the tire proper are cut away on their under sides, forming thereby shoulders $b$, which are flush with the sides of the felly.

G and G' designate supporting-rings fashioned to fit snugly against the sides of the felly and having even outer faces which rest in the cut-away portions of the overhanging edges of the tire. These rings are securely held in place by transverse bolts D, passing through suitable openings therein and through perforations formed transversely through the felly. By tightening the bolts the rings are held firmly in place, and as their edges project beyond the periphery of the felly and into the reduced portions of the tire the shoulders $b$ engage the same, and the rings thereby act as means for preventing a transverse movement of the tire on the felly. In addition to the function of preventing side movement the rings also act as braces or supports for the outer edges of the tire, transferring the impact or pressure directly to the rim through rings and bolts, as will be readily understood. Conveniently the rings are slightly tapered to a bracket form or shape in cross-section. This, however, is not material.

Figure 3:
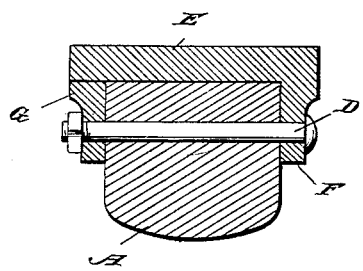

In Fig. 3 is shown a modified form of the invention, wherein the broad tire E has an integral ring F at one side, lying close to the side of the felly, and a removable ring G is secured to the side of the felly at the opposite side, the ring corresponding in shape and size to the integral ring. In this construction the bolt is passed through the integral flange or ring.

By the construction above described it will be seen that a broad-tread tire can be applied to the usual or regular rim and is so braced and held that the same will, in effect, be as satisfactory as though the felly itself were made of sufficient width to support the entire width of the tire. It will therefore be observed that the ordinary wheels can be readily equipped with the broad tires at slight expense and with but little trouble.

Having thus described my invention, what I claim as new, and desire to secure by Letters Patent, is—

1. The combination with a felly, of a tire thereon, of a width greater than the width of the felly, rings at the sides of the felly for supporting the overhanging portions of the tire, and bolts passing through the rings and felly, substantially as described.

2. The combination with a felly, of a tire thereon of a width greater than that of the felly, and having shoulders formed on its inner face, of rings at the sides of the felly, extending beyond the same and engaging the shoulders, and bolts passing through the rings and felly for securing the rings in place, substantially as described.

In testimony whereof I affix my signature in presence of two witnesses.

ALLEN L. MILLER.

Witnesses:
ELISEBETH K. MILLER,
MARY L. TEW.